March 23, 1954  A. J. FRUIT  2,672,849
SYNTHESIS GAS GENERATOR
Filed Dec. 16, 1949  5 Sheets-Sheet 3
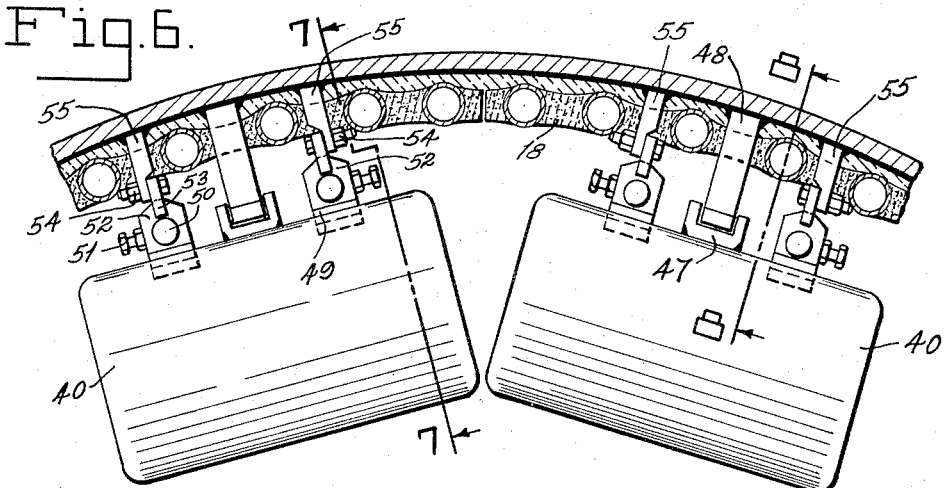
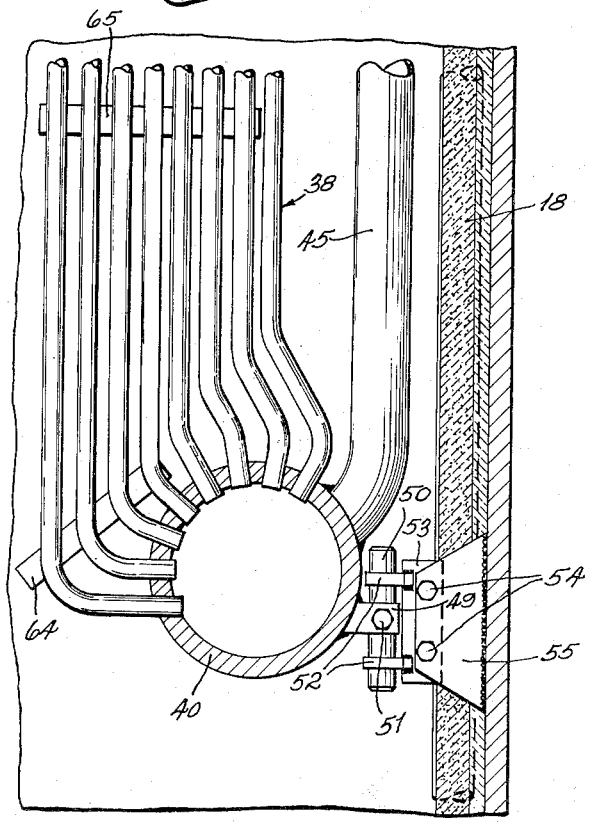
INVENTOR.
ALLEN J. FRUIT
BY
ATTORNEYS March 23, 1954 A. J. FRUIT 2,672,849
SYNTHESIS GAS GENERATOR
Filed Dec. 16, 1949 5 Sheets-Sheet 4

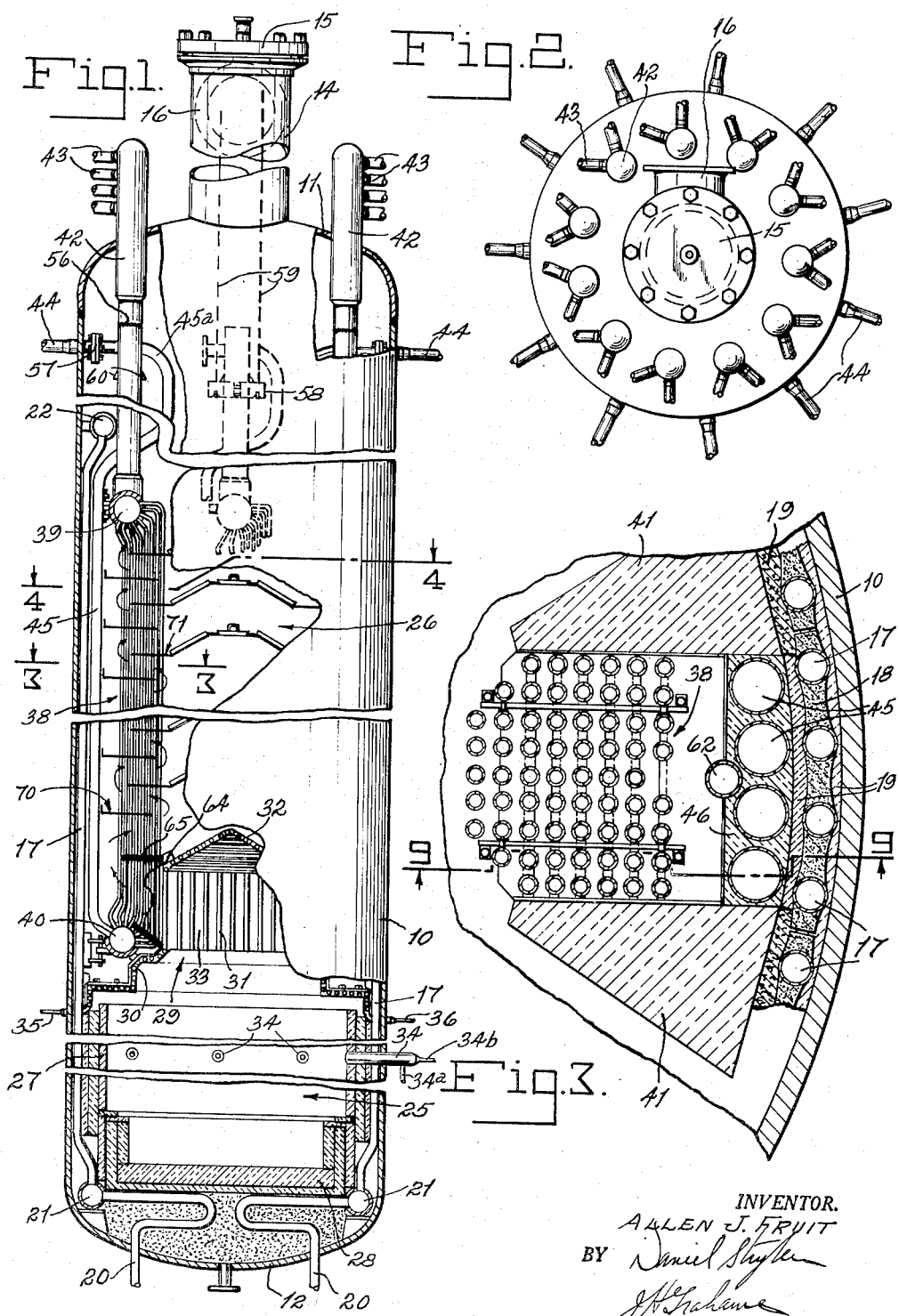

INVENTOR.
ALLEN J. FRUIT
BY
ATTORNEYS

March 23, 1954    A. J. FRUIT    2,672,849
SYNTHESIS GAS GENERATOR
Filed Dec. 16, 1949    5 Sheets-Sheet 5

INVENTOR.
ALLEN J. FRUIT
BY
ATTORNEYS

Patented Mar. 23, 1954

2,672,849

UNITED STATES PATENT OFFICE 2,672,849

SYNTHESIS GAS GENERATOR

Allen J. Fruit, Millington, N. J., assignor to Hydrocarbon Research, Inc., New York, N. Y., a corporation of New Jersey Application December 16, 1949, Serial No. 133,363

5 Claims. (Cl. 122—333)

The present invention relates to gas generation, and more particularly, to generation of synthesis gas for the catalytic synthesis of hydrocarbons, oxygenated hydrocarbons and mixtures thereof.

Broadly, the invention contemplates high temperature generation of synthesis gas in a refractory-lined chamber by the controlled combustion of a carbonaceous material such as coal, oil or natural gas, with substantially pure oxygen in appropriate proportions for partial combustion, to form high yields of hydrogen and carbon monoxide in essentially pure form. Temperatures in the order of 2200-2500° F. and above prevail within the gas generation zone, as an essential element of producing maximum gaseous product, and the gases are discharged at this temperature into a cooling zone in which the product gases are rapidly cooled by indirect exchange down to a level in the order of 600-650° F. The rapid rate of cooling resulting from effective heat exchange forestalls secondary reactions which result in loss of yield and contamination of the final hydrogen-carbon monoxide mixture.

The discharged and cooled product gas is thus carried below the range at which product reversion and undesired secondary reactions occur, to a temperature level suitable for charging directly to the hydrocarbon synthesis reaction to form the desired final hydrocarbon products.

In accordance with the present invention, the gas generation chamber is arranged so that the high temperature partial combustion product discharges directly across a multiplicity of longitudinally extending tubes containing water or other coolant, thereafter following a sinuous path involving a plurality of transverse passages throughout the length of the tubes, meanwhile transferring its heat energy by indirect exchange to the coolant and generating steam or other high pressure vapor.

To this end, the present invention embodies a combined gas generator, cooler and steam generator, in which the hot, freshly generated synthesis gas is discharged centrally and laterally into a relatively elongated and preferably upstanding chamber. A plurality of individual boiler tube bundles are disposed about the periphery of the elongated steam generation chamber, with tubes in each bundle extending longitudinally thereof.

Each bundle of steam tubes preferably forms an integral unit with respective upper and lower headers or drums, each unit being individually suspended from above and provided with individual, respective water and steam pipes. The central portion of the elongated chamber provides a space sufficient to accommodate any one of the peripherally arranged tube bundle units, so that upon detachement from its supports, any tube bundle may be swung out into this central space and lifted through a convenient aperture in the extremity of the chamber. As a result, the repair, replacement and normal servicing of the steam generation equipment is highly simplified in spite of the provision of large amounts of cooling surface needed to enable realization of the rapid heat exchange referred to above.

As above intimated, provision is made for injecting the hot product gas laterally across the lower extremities of the steam tubes and continuously thereafter effecting repeated lateral traverse of the gases as they progress upwardly in the peripheral region of the chamber occupied by the tubes. To this end, the outlet ports of the gas generation or combustion chamber occupy the central portion of the chamber, bounded by the lower extremities of the peripherally disposed tube bundles, so that the hot gas flow is radially outward.

Thereabove, the steam generation chamber is occupied by a plurality of collapsible baffles which include vertically spaced, inwardly extending, peripheral baffles and intermediate, outwardly projecting central baffles. The inwardly projecting, peripheral baffles extend from the wall of the gas generation chamber inwardly a substantial distance embracing a major portion at least of the steam tubes and terminating short of the central axis of the chamber, thus tending to direct the gases inwardly across the steam tubes. The central baffles are composed of separable, central sections to which are attached collapsible baffle members which embrace a substantial portion of the steam tubes but terminate short of the peripheral walls of the chamber. The central baffles thus direct the gas flow outwardly or radially across the steam tubes.

In order to describe the invention in greater detail, reference is had to the attached drawings, exemplifying one preferred, illustrated embodiment, wherein Figure 1 is an elevational view, partly in section and partly broken away, showing the selected embodiment;

Figure 2 is a top plan view of the generator shown in Figure 1;

Figure 3 is a partial sectional view taken on the line 3—3 of Figure 1;

Figure 6 is a partial horizontal sectional view looking upwardly toward the bottom of the lower tube bundle headers;

Figure 4:
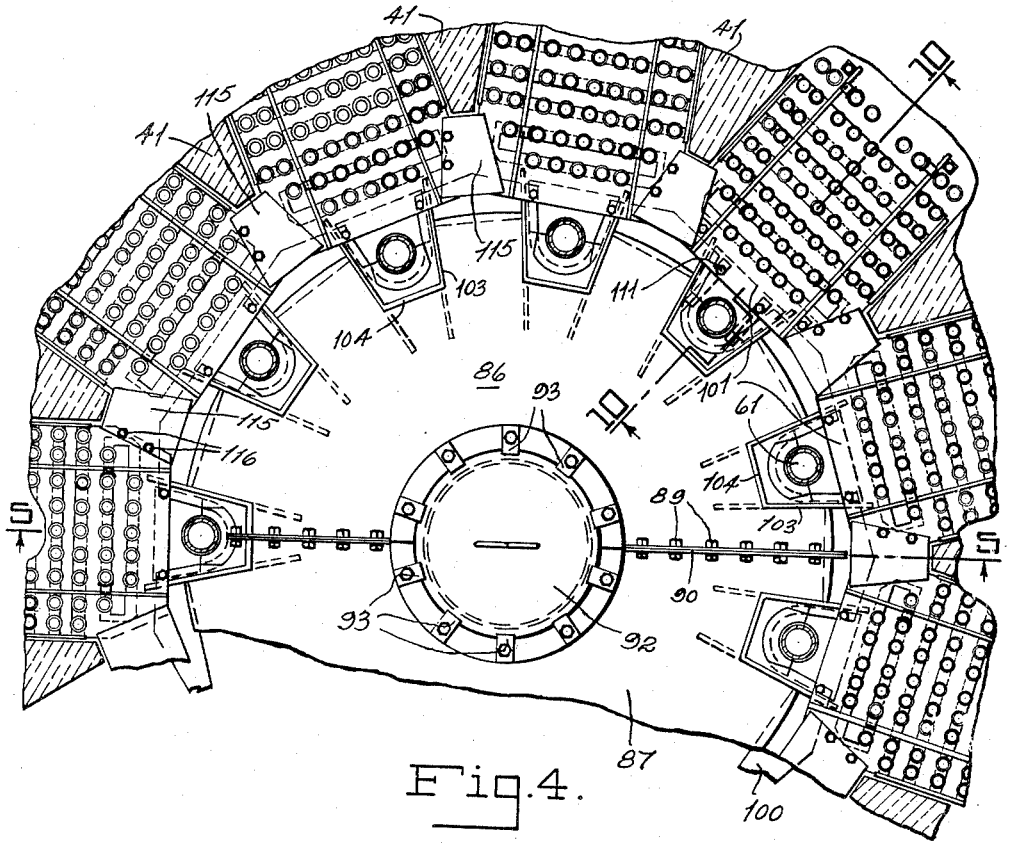
Figure 4 is a detailed sectional view taken on the line 4—4 of Figure 1.
Figure 9:
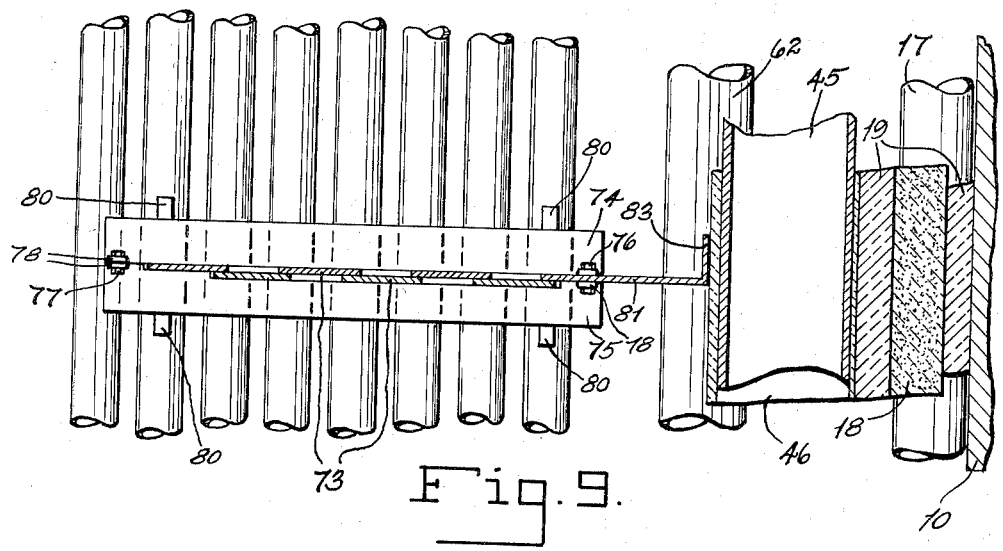
Figure 10:
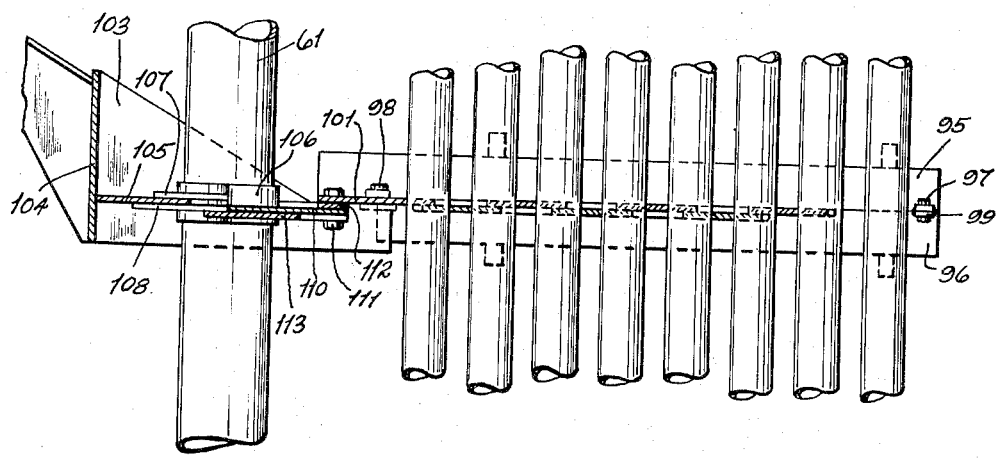
Figure 11:
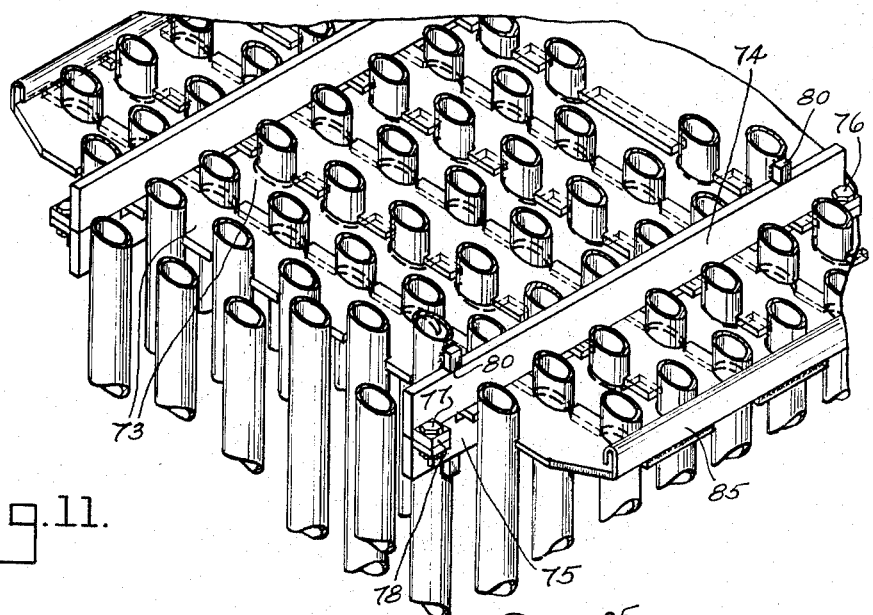
Figure 12:
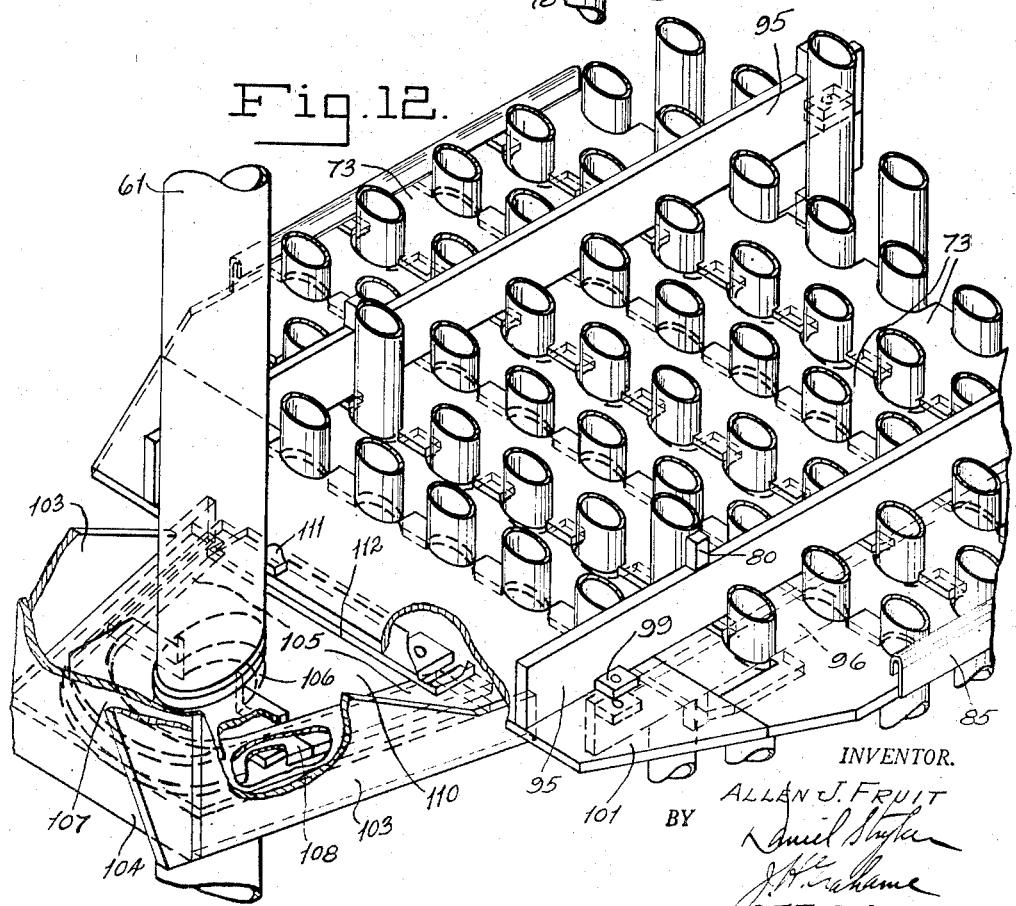

Figures 7 and 8 are respectively vertical sectional details taken on the line 7—7 and line 8—8 of Figure 6;

Figure 9 is a detailed vertical section on the line 9—9 of Figure 3;

Figure 10 is a similar vertical sectional detail on the line 10—10 of Figure 4; and Figures 11 and 12 are perspective views respectively of the inwardly extending, peripheral baffle and outwardly extending, central baffle constructions.

In the drawings, a cylindrical, vertically extending shell 10 is provided at its upper and lower extremities with convex heads 11 and 12 respectively. The upper dome or head 11 of the vessel is provided with a cylindrical extension 14 surmounted by a cover or closure 15. An outlet duct 16 extends from the cylindrical extension to deliver the final cooled product gas for further disposition or use not indicated.

Provision for protecting the walls of the vessel or shell from overheating assumes the form of vertical tubes 17, shown more clearly in Figure 3. A suitable refractory material extends between the tubes as at 18, and insulating material, such as glass wool, is packed on either side thereof as at 19. The tubes 17 are preferably supplied with coolant liquid through pipes 20 and header 21, with suitable provision, not shown, for removal of the heated coolant from upper header 22.

The lower portion of the vessel 10 comprises a gas generation chamber 25, whereas the portion thereabove comprises a steam generation chamber 26.

The combustion or gas generation chamber 25 is defined by relatively thick refractory cylindrical walls 27, a bottom wall section or floor 28 and a cover or cap 29.

The cover or cap section 29 of the gas generation chamber, forming as it does a roof or a cover for the preferably open and unoccupied combustion space, must obviously possess considerable structural resistance to high temperatures. Accordingly, therefore, it is preferably formed, as shown, of closely arranged convolutions, runs or pancakes of pipe to form a rigid wall structure and coated, enclosed or encased by refractory material.

The lower portion of the cap or cover extends inwardly and upwardly as at 30 to meet an upwardly extending, cylindrical section 31 which terminates in an upper central and preferably imperforate conical extremity 32. As shown, the cylindrical wall section 31 is preferably formed of upstanding groups of pipes provided with intermediate apertures or ports 33 for the hot products of partial combustion. The pipe structure of the combustion chamber cap or roof 29 is advantageously formed of separate, removable, segmental units of continuous pipe section which join together to form the structure indicated.

A plurality of radially directed burners 34, as indicated more or less diagrammatically in Figure 1, extend through the walls 27 of the generation chamber about midway between the top and bottom extremities of said wall. The reactants, as for example, natural gas and pure rectified oxygen, are introduced to the burner through inlets 34a and 34b respectively.

In the embodiment shown, cooling water is fed to the tubular cap structure through inlet pipe 35 and withdrawn by way of pipe 36.

The steam generation section of the vessel, as indicated more clearly in Figures 1, 3 and 4, comprises a series of unitary tube bundles 38, each integrally bonded together by connection with upper and lower drums or headers 39 and 40 respectively.

As will be apparent from Figure 6, the drums or headers of each tube bundle are unitary, closed cylindrical vessels occupying only a portion of the peripheral space about the interior of the vessel. Moreover, as shown more clearly in Figures 3 and 4, the peripheral portion of the vessel is preferably provided with inwardly extending, segmental projections 41 of refractory, which form a series of peripherally spaced, vertically extending recesses or passageways. Each tube bundle unit is suspended within its respective peripheral recess by large steam pipe 42, attached to the dome of the vessel, as indicated, and communicating with the interior of the upper manifold or drum 39.

The mixture of water and steam flowing upwardly through supporting pipe 42 passes through lines 43 to a steam separation drum not shown, and the separated water is returned through pipe 44 to downcomer 45. In the embodiment disclosed, a plurality of relatively flexible downcomers are connected with the lower drum or header 40. Where they pass downwardly through the steam generation chamber, the downcomers are preferably protected by a refractory coating 46 (Fig. 3).

Each tube bundle is retained laterally within its recess by a guide-way structure shown in greater detail in Figures 6, 7 and 8. Thus, a vertically extending channel member 47 attached to each header or drum rests against and embraces the vertically extending edge of radially inwardly projecting member 48, attached to the wall of vessel 10. In addition, outwardly projecting lugs 49 on the drums receive vertically extending pins which are rigidly attached thereto by set screws 51.

As indicated, the vertically extending pins 50 are slidably received by apertured lugs 52, attached to vertically extending plates 53 which are releasably bolted as at 54 to complementary plates 55, in turn welded to the shell 10.

Accordingly, therefore, it will be apparent that each unitary bundle is supported for vertical freedom of play under the expansive and contractive influences encountered in high temperature operation. That is to say, vertical support is afforded substantially exclusively by the tube 42, as a result of which the drums are free to move vertically under the influence of expansion and contraction. Under such influence, the guide bars or pins 50 and the channel members 47 slide freely, relative to the respective apertured lugs 52 and the guide rail or track 48. On the other hand, by simply releasing fastening 51 or 54, and disconnecting downcomers 45 and steam pipes 42, the tube bundle units are readily removable from the guide structure and can be swung out, as indicated by dotted lines in the central portion of Figure 1, for removal through the upper hatchway or closure 15.

Disconnection of the steam pipes 42 is most readily effected by burning through at welded joint 56, and downcomers 45 may be released by separating the coupling 57. However, it is usually most convenient to cut and reweld both joints.

As above indicated, a clamping collar 58 suspended by lines 59 from a suitable crane not shown embraces the tube 42 beneath lugs 60, permitting it to swing out freely in the central portion of the vessel and be removed for repair and replacement.

It is to be noted that vertically extending tubes 61 and 62 (see Figures 3, 4, 5, 9, 10 and 12) are not tube bundles but are vertical soot cleaners, open at the bottom and projecting downwardly a substantial distance into the steam generation zone from a point in the upper portion of the vessel not shown for the purpose of blasting or dislodging accumulated soot and carbon which tends to deposit in the vessel during continuous operation. In other words, the pipes are provided to direct high velocity streams of steam or air or some other suitable gas into the lower portions of the steam generation chamber. Since the provision for connecting the upper extremities of these pipes with a suitable source of high pressure gas may take various forms, the details thereof are not disclosed and, per se, form no part of the present invention.

The high temperature partial combustion product passing radially outwardly through the ports 33 is initially directed across the lower portions of the cooling tubes in bundle 38 between refractory baffles 64 and 65 (Figures 1 and 7).

Baffle 64 protects the lower drum 40 and the adjacent structure from direct impingement by the excessively hot combustion products while baffle 65 directs the gases across the lower portion of the cooling tubes. Manifestly, a relatively sharp initial cooling takes place in this region. Therefore, the gases which move upwardly about the outer margin of baffle 65 are sufficiently reduced from the initial high temperature so that refractory protection of the remaining baffles is not necessary, as will hereinafter appear.

Baffles 64 and 65 advantageously are simply plastered or molded refractory walls built up about the cooling tubes in any suitable manner, and removable with the tube bundle unit.

After passing baffles 64 and 65, the gases move upwardly in a series of repeated traverse passages across the cooling tubes, as indicated in Figure 1. This flow is maintained by a series of vertically spaced, inwardly extending, peripheral baffles 70 separated by intermediate, outwardly projecting baffles 71.

The structure of these baffles, as is shown more clearly in Figures 3, 4, 5 and 9 through 12, admits of easy assembly and disassembly to facilitate removal and replacement of the tube bundles above described. For example, the inwardly extending, peripheral baffles, shown more clearly in Figures 3, 9 and 11, are composed of a series of plates 73, provided with semi-circular recesses or serrations which engage the surfaces of the cooling tubes. The plates 73, when disposed vertically, are passed between adjacent rows of cooling tubes and tilted into the horizontal position indicated to embrace the tubes and close the intervening spaces. When arranged in alternate, overlapping relationship, as shown in Figures 9 and 10, they close this area with an imperforate barrier. Thus arranged, plates 73 of the inwardly projecting, peripheral baffles are held in place by recessed clamping bars 74 and 75 joined by fastenings or bolts 76 and 77, which pass through flanges 78. Additional strength and rigidity is provided by marginal side flanges 85 welded to the extremities of plates 73, as indicated in Figure 11.

Projecting lugs or tabs 80 enable the baffle to be spotted to adjacent tubes, as indicated, to support the baffle against vertical dislodgement. Outermost plate 81 extends across the area between the tube bundle and the refractory lining 46, terminating in flange 83 to prevent any material leakage.

For replacement or repair of a tube bundle, it may be slid out of its recess without dismantling of the baffle. Alternatively, the baffle may be readily dismembered prior to removal by releasing the bolts 76 and 77 and cutting the welds at the lugs 80 and the flange 85.

Figure 5:
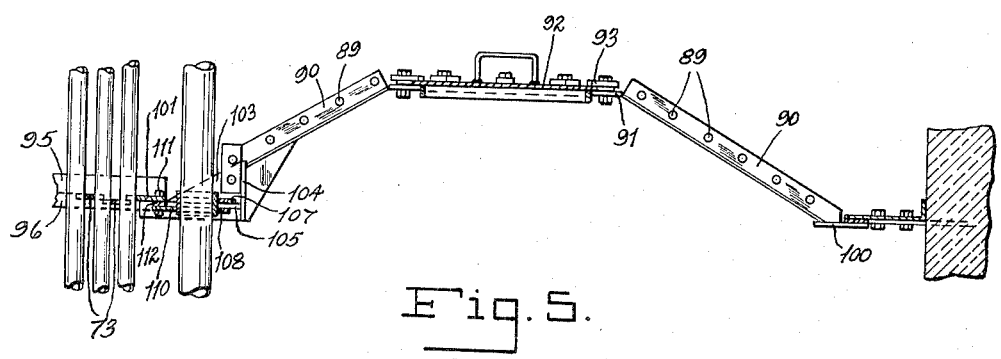
Figure 5 is a vertical sectional view taken on the line 5—5 of Figure 4.

The central, outwardly projecting baffle arrangement, as shown more clearly in Figures 4 and 5, comprises central partitions formed by pairs of segmental, frusto-conical members 86 and 87 joined by fastenings 89 passed through radial flange 90. A central, segmental collar 91 receives a removable manhole cover 92 releasably held in place by bolted lugs 93, for ready access to the central portion of the steam generator.

As shown more particularly in Figures 10 and 12, the central portion merges relatively imperforately with a cooling tube embracing section which has approximately the same general structure as that previously described in connection with the inwardly extending baffles. In other words, recessed plates 73, alternately arranged in overlapping relationship, are held in place by clamping bars 95 and 96, secured together by bolts 97 and 98 passing through lugs 99. So also, lugs 80 and flanges 85 permit spotting into a unitary structure.

Merger between the central, frustoconical portion of the baffle and tube embracing sections is afforded by a plurality of radially extending plates 100, welded to the outer margin of the frustoconical wall and projecting under the extremity of a baffle plate 101 which forms the innermost portion of the cooling tube embracing plates.

In addition, provision is made for closing the space about the soot blowing tubes 61, which in general comprises peripheral recesses formed in the frustoconical wall by paired, radially and vertically extending ribs or flanges 103, joined at their inner extremities by flanges 104. Horizontal plates 105 fixed within the recesses formed by these ribs or flanges are cut away as indicated in Figure 12, to pass about tubes 61. Collar 106, slidable on tubes 61, is provided on its outer margin with spaced, segmental, upper and lower flanges 107 and 108 respectively, which embrace the fixed plate 105. Therefore, it is apparent that after the conical baffle units 87 are arranged in position, the collars 106 can be vertically aligned with plate 105 and rotated to cause flanges 107 and 108 to embrace the plate, as shown. Thereafter, plate 110, which occupies the space between the tubes 61 and the tube embracing baffles, is moved into place and attached to the plate 101 by bolts 111. Advantageously, as indicated, spacer 112 separates the plate 110 and bolts 111.

Advantageously, the bolts 111 engage lower clamping plates 113, which project at substantial distances under plates 110 and 108 to afford additional support.

Closure plates 115 advantageously cover the area at the extremity of the refractory partitions or ribs 41 and are held in place by fastenings 116 which interconnect with either or both of the adjacent tube embracing baffles.

As clearly indicated and above shown, the outwardly projecting baffles terminate short of the steam generation chamber margin, and the inwardly projecting, peripheral baffles terminate inwardly in the central portion of the chamber. As indicated, the baffles most advantageously terminate inside of the marginal tube rows so that the gases to be cooled are in relatively close contact with the cooling tubes throughout their upward path of movement.

From the foregoing, it is apparent that the internal structure of the steam generation unit is readily constructed by assembling each individual tube bundle in its entirety outside of the gas generation vessel. The unit is then lowered into position, as indicated by the dotted lines of Figure 1, swung over into its peripheral position and attached to the lateral supporting guide or structures, as seen in Figures 6 through 8, and vertically is supported by attachment of couplings 56 and 57.

As above indicated, under modern welding practice, the formation of welds at this point probably represents most economical and rapid practice. Also, provision of ordinary pipe couplings is equally permissible.

It is important to note that the tube embracing baffle arrangement may be assembled on the tube bundles before insertion into the vessel, or where desired, is conveniently assembled by a workman after mounting within the shell. The assembly is completed simply by suspending the conical baffle segments 86 and 87 in position, bolting them together, swinging slidable collars 106 into interengaging position therewith and applying the collar plates 110 and 115.

Disassembly to permit replacement of a worn tube bundle or the like is manifestly the reverse of the foregoing.

As above intimated, the tube embracing baffle arrangement may manifestly be simplified where desired by attaching integral or other baffle means to the tube bundles externally of the unit provided so that the bundles set and move readily into the peripheral recesses provided within the steam generation chamber. Likewise, the provision of separate recesses for the tube bundling units may be omitted by eliminating the refractory partition members 41 and applying removable cover plates to complete the baffles in this area. The structure may be also considerably simplified where other means is provided for soot blowing or cleaning, by elimination of the soot tubes 61 and 62 and the exhaust structure. In such an embodiment, the central frustoconical wall assumes the relatively simple form in which the marginal plate simply engages under the peripheral baffle structure. It is apparent that the foregoing structure compensates inherently for the expansive and contractive strains otherwise inherent in an exchanger involving excessively high temperature variations.

Actually, suspension of the tube bundle units in the manner disclosed completely eliminates such strains with the minor exception of those imposed upon downcomers 45. However, by the subdivision of the downcomer stream into a plurality of relatively small conduits of flexible nature and provided with flexure loops as indicated at 45a, the undesirable effect is minimized, so that it becomes completely immaterial from the practical operating standpoint.

Obviously, many other modifications and variations of the present invention as hereinbefore set forth may be made without departing from the spirit and scope thereof, and therefore, only such limitations should be imposed as are contained in the appended claims.

I claim:

1. In a fluid heat exchange installation, a vertically extending cylindrical pressure vessel shell having a reaction chamber in its lower portion and a gas outlet at its upper end, heat absorbing means disposed within the shell and between the reaction chamber and the gas outlet port and including a circular arrangement of convector vapor generating units, each of said units having such transverse dimensions that it will pass through said port when not joined to its tubular connections, an upper and a lower header for each unit, a group of horizontally spaced upright tubes for each unit connecting the upper header to its lower header, a vapor outlet tube extending upwardly from each upper header through the upper part of the shell and secured thereto, a refractory cylindrical wall for the reaction chamber having a refractory floor and entirely disposed within the shell, and upright wall tubes in circular arrangement between the shell and the refractory reaction chamber wall and connected into the fluid circulation of said installation, said wall tubes extending to a level above the level of the upper headers of the convector units.

2. In a fluid heat exchange installation, a vertically extending cylindrical pressure vessel shell having a reaction chamber in its lower portion and a gas outlet port in its upper portion, a plurality of convector vapor generating units arranged annularly within the upper portion of the shell between the reaction chamber and the gas outlet port, each of said units including an upper header and a lower header connected by horizontally spaced upright tubes, a releasable closure at the upper portion of said shell of such transverse dimensions as to permit introduction and removal of a single complete vapor generating unit, and a fluid discharge tube extending upwardly from the upper header of each of said vapor generating units through the upper portion of the shell.

3. In a fluid heat exchange installation, a vertically extending cylindrical pressure vessel shell having a reaction chamber in its lower portion and a gas outlet port in its upper portion, a plurality of convector vapor generating units arranged annularly within the upper portion of the shell between the reaction chamber and the gas outlet port, each of said units including an upper header and a lower header connected by horizontally spaced upright tubes, a releasable closure at the upper portion of said shell of such transverse dimensions as to permit introduction and removal of a single complete vapor generating unit, and a thermal shield including a fluid-circulating tubular coil disposed between the reaction zone and the lower headers of said vapor generating units.

4. In a fluid heat exchange installation, a vertically extending cylindrical pressure vessel shell having a reaction chamber in its lower portion, reactant inlets in said reaction chamber, a gas outlet port in the upper portion of said shell, a plurality of convector vapor generating units within the upper portion of said shell between the reaction chamber and the outlet port, said units arranged about the wall of the shell in an annular array with an unoccupied central space sufficient to accommodate any single unit, each of said units including a lower header and upper header connected by horizontally spaced upright tubes, a liquid and vapor drum arranged exteriorly of said shell, a tube extending upwardly from the upper header of each of said units through the upper portion of said shell and connected with said liquid and vapor drum, and a releasable closure at the upper extremity of said shell directly above said central space and of such transverse dimensions as to permit introduction and removal of a single complete vapor generating unit.

5. In a fluid heat exchange installation, a vertically extending cylindrical pressure vessel shell having a reaction chamber in the lower portion thereof, reactant inlets in said reaction chamber, a gas outlet port in the upper portion of said shell, a plurality of convector vapor generating units arranged annularly within the upper portion of said shell between the reaction chamber and the outlet port with an unoccupied central space sufficient to accommodate any single unit, each of said units including a lower header and an upper header connected by horizontally spaced upright tubes, a thermal shield including a fluid-circulating tubular coil disposed between the reaction chamber and said convector units, a releasable closure at the upper extremity of said shell directly above said central space and of such transverse dimensions as to permit introduction and removal of a complete vapor generating unit, a liquid and vapor drum arranged exteriorly of said shell, and a fluid discharge tube extending upwardly from each of said upper headers through the upper portion of said shell and connected with said liquid and vapor drum.

ALLEN J. FRUIT.

References Cited in the file of this patent

UNITED STATES PATENTS

| Number | Name | Date |
|---|---|---|
| 333,691 | Stewart | Jan. 5, 1886 |
| 443,122 | Stevens | Dec. 23, 1890 |
| 447,916 | Stewart | Mar. 10, 1891 |
| 721,310 | Junkers | Feb. 24, 1903 |
| 1,757,232 | Becker | May 6, 1930 |
| 1,781,764 | Peperkorn | Nov. 18, 1930 |
| 1,802,413 | Engler | Apr. 28, 1931 |

OTHER REFERENCES

Ser. No. 303,852, Szigeth (A. P. C.), published Apr. 27, 1943.